INVENTORS
BRUNO STILLHARD
WALTER TOBLER

March 18, 1969  B. STILLHARD ET AL  3,433,256
ELECTROHYDRAULIC VALVE
Filed March 10, 1966  Sheet 2 of 3

INVENTORS
BRUNO STILLHARD
WALTER TOBLER

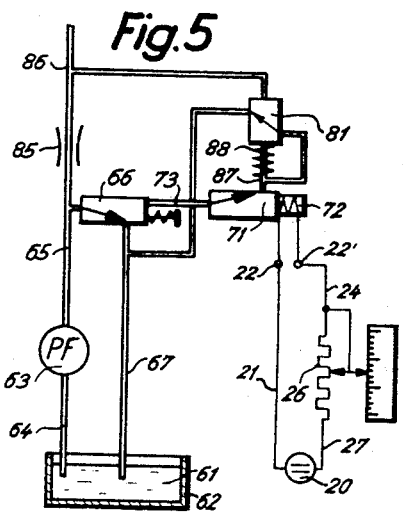
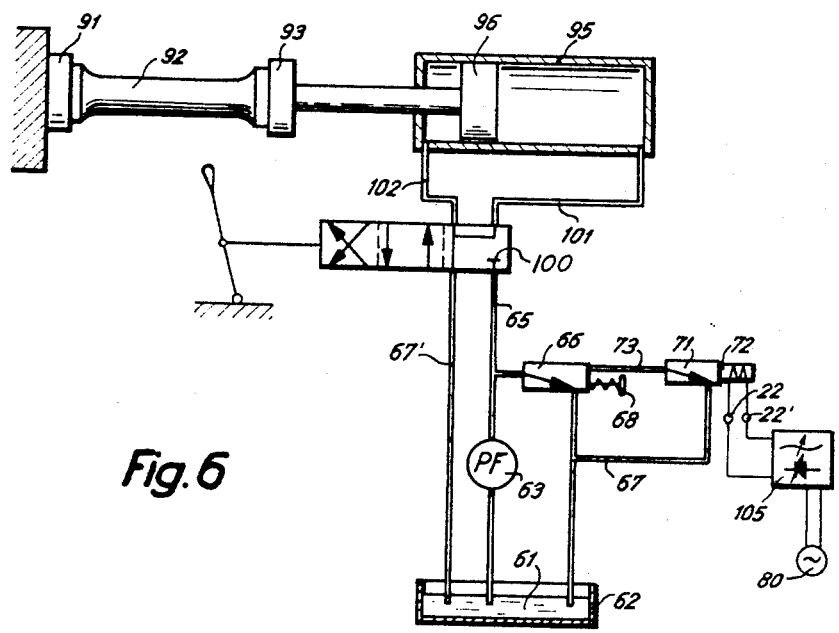

United States Patent Office 3,433,256
Patented Mar. 18, 1969

3,433,256
ELECTROHYDRAULIC VALVE
Bruno Stillhard, Saint Gall, and Walter Tobler, Uzwil, Switzerland, assignor to Gebrüder Buehler, Uzwil, Switzerland
Filed Mar. 10, 1966, Ser. No. 533,316
Claims priority, application Switzerland, Mar. 11, 1965, 3,380/65; Jan. 18, 1966, 598/66
U.S. Cl. 137—529                                                       29 Claims
Int. Cl. G05d 7/00, 16/20; F16k 31/06

ABSTRACT OF THE DISCLOSURE

An electromagnetically controlled fluid pressure regulator comprises a bell-shaped magnetic core having a central leg with a magnetizing winding imbedded in an annular recess surrounding the central leg and arranged for connection to a source of regulable electric potential. A movable yoke is axis-symmetrical with the core and has magnetically active surfaces for movement of the yoke relative to the core in accordance with energization of the winding. A pressure medium inlet bore extends through the central leg of the core, and a valve element is mounted on the yoke to control discharge of pressure medium toward the yoke in accordance with the spacing of the yoke relative to the core, the valve element normally closing the pressure medium bore. The arrangement is such that the electromagnetic forces on the yoke tend to draw the yoke toward the core and oppose the fluid pressure forces on the yoke which tend to force the yoke away from the core. Membrane or spring means may be used to support the yoke.

---

This invention relates to electromagnetically controlled fluid pressure setting valves and, more particularly, to a novel and improved valve of this type including an axis-symmetrical bell magnet with an imbedded magnetic coil winding, a yoke, a pressure medium connection, a flow channel arranged in one leg of the magnet and communicating with the pressure medium connection, and a fluid control element arranged between the yoke and this flow channel.

While electromagnetically controlled pressure setting valves for pressure fluid systems, such as hydraulic systems, are already known, they are subject to numerous disadvantages. For example, there is a high friction component between the parts to be moved in the pressure setting means and in the electromagnetic setting member, relative to the electromagnetic force available and the fluid force to be adjusted. This friction component effects, in the ratio of hydraulic pressure value to electric excitation current, too great a hysteresis upon energization and de-energization. Thus, a set or fixed pressure value lying within narrow tolerances cannot be made to correspond to any specific excitation current value.

In another system, in which the magnetic yoke also functions as the closing element of the valve, a spring is provided with a strength such that it is able to counteract the total maximum pressure to be with stood by the valve. In this case, considerable excitation is necessary just to overcome the spring force, and a particular excitation current for the magnetic winding or coil will never correspond to a specific pressure value. Valve systems of this type are suitable for on-off switching, but not for pressure setting or regulating.

Additionally, an electromagnetically controlled pressure setting valve has been proposed wherein an elastic membrane functions simultaneously as the yoke of the magnet and the support of the valve body. This device has the disadvantage that the initial elastic tension of the membrane corresponds to the maximum fluid pressure value to be controlled. Consequently, the electric excitation is inversely proportional to the pressure value to be set, the membrane must be so dimensioned mechanically that, with increasing excitation, an increasingly strong magnetic saturation takes place, whereby the magnetization characteristic will not be linear, and consequently the electromagnetic efficiency becomes very low requiring an oversized magnetizing winding or coil.

Another form of electromagnetic pressure setting valve is similar to a relay in that it has a magnetic winding on a central core, a shell enclosing the winding, and a yoke pivotal about a point or axis of rotation. The pressure medium to be adjusted is then applied to a channel in the central core, and is controlled in the zone of the yoke by a valve body connected with the yoke and opposite the channel. The disadvantage of this type of valve is the friction in the zone of the pivotal suspension of the yoke, the inefficient form of the magnetic circuit, with resultant overdimensioning of the excitation coil being required, and the relatively great hysteresis in the current-pressure characteristic. Furthermore, the amount of stray flux is high and not determined or controlled, so that major indeterminate components are involved in the control.

An object of the present invention is to provide an electromagnetically controlled fluid pressure setting valve free of the disadvantages of known valves of this type.

Another object of the invention is to provide an electromagnetically controlled fluid pressure setting valve including an E magnetic core which may be circular so as to constitute a so-called "bell magnet," and in which a yoke is designed substantially axis-symmetrical with the bell magnet.

A further object of the invention is to provide an electromagnetically controlled fluid pressure setting or regulating valve of the type just-mentioned in which the yoke is movable without friction in opposition to the bell magnet.

Yet another object of the invention is to provide an electromagnetically controlled fluid pressure setting or regulating valve of the type just-mentioned in which the yoke is so disposed as to leave free a substantially constant and equal air gap between all legs of the bell magnet and the magnetically active surfaces of the yoke.

Still a further object of the invention is to provide an electromagnetically controlled fluid pressure setting or regulating valve which is simple in design and inexpensive in construction, and which is readily adaptable in numerous applications.

For an understanding of the principles of the invention, reference is made to the following description of typical embodiments thereof as illustrated in the accompanying drawings.

In the drawings:

FIG. 5 is a view similar to FIG. 4 illustrating the valve embodying the invention used as a compensating volume regulator;

FIG. 6 is a view similar to FIGS. 4 and 5 illustrating the valve embodying the invention as used for controlling a pulsator.

Figure 1:
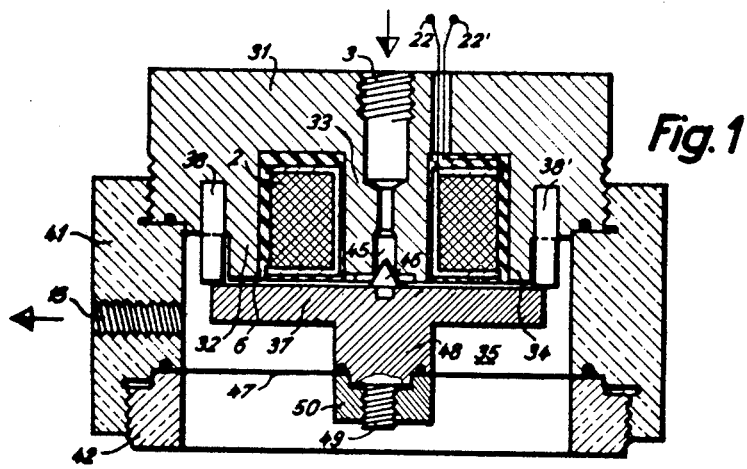
FIGS. 1, 2 and 3 are axial sectional views of three different forms of electromagnetically controlled fluid pressure setting valves, or pressure regulators, embodying the invention.

Electromagnetically controlled fluid (hydraulic) pressure setting valves, or pressure regulators, comprise two control elements or systems acting in cooperation or having mutual interaction, namely a fluid system, such as a hydraulic system, and a magnetic system. Such a valve is shown in FIG. 1 wherein the magnetic system includes a magnetic core of paramagnetic material illustrated at 31 as an E core or bell magnet. The three legs 32, 33 and 34 of magnet core 31 may be designed as individual salient poles, or the outer legs 32 and 34 may be combined to form a ring while the center leg 33 is formed as a peg. A magnetizing coil or winding 2 is inserted into the recesses between leg 33 and legs 32 and 34, or alternatively these recesses may be designed as a single annular recess.

Center leg 33 of E core or bell magnet 31 is arranged additionally with a pressure medium connection, illustrated as a passage 3 through leg 33. Opposite the magnetic core 31, there is a yoke 37, which may be of paramagnetic material, or at least have magnetically active surfaces. To insure a minimum and definitely pre-set air gap 6, yoke 37 is limited, relative to magnet core 31, by diamagnetic or non-magnetizable pins 38, 38'. Magnetic winding or coil 2 inserted in the magnet core is imbedded therein pressure-fast with an insulating composition.

A ring 41 of diamagnetic or non-magnetizable material is secured in leak-proof relation to the magnetic core 31. Ring 41 is formed with a pressure medium connection 15, and is also formed to receive a clamping ring 42. For example, parts 41 and 42 may be threadedly interconnected in pressure sealed relation, and a membrane 47 is clamped between rings 41 and 42. Yoke 37 is supported centrally of membrane 47 by virtue of a central boss 48 having a threaded extension 49 extending through membrane 47 and locked to the membrane by a nut 50. Membrane 47 is dimensioned in such a manner that it exerts, on yoke 37, only a negligible force relative to the occurring fluid pressure and magnetic force, and serves merely to hold the yoke, in a weight-compensated manner, opposite the core 31.

The fluid pressure setting valve is mounted on the just-described magnetic and mechanical construction. Thus, yoke 37 serves to receive and support a valve body 46 which preferably is formed of diamagnetic or non-magnetizable material. Valve body 46 is designed to engage the periphery or rim of a bore 45 forming an extension of pressure medium connection 3. Bore 45, together with valve body 46, constitutes, in the unloaded stage, a termination of the pressure medium connection 3.

The operation of the valve shown in FIG. 1 will be made clear from the following description. This valve is adaptable to an arrangement wherein connection 15 is connected with a hydraulic tank or sump so that the space defined by core 31, ring 41, membrane 47, and peg or boss 48 of yoke 37 is under normal or ambient atmospheric pressure, i.e. under the pressure prevailing outside or exterior to membrane 47. The pressure medium to be regulated flows through bore 45 and acts against valve body 46. In the absence of excitation of winding 2, valve body 46 and yoke 37 supporting the valve body are immediately lifted to such an extent that the pressure medium entering through passage 3 can flow without hindrance into space 35 and then through connection 15 back into the tank or sump. Consequently, there will be no pressure buildup in the hydraulic system connected to the connection 3.

Magnetizing winding 2 is energized through the medium of leads connected to junction points 22 and 22'. The excitation of the magnetic circuit, comprising core 31, air gap 6 and yoke 37, is dependent upon the potential applied to junction points 22 and 22', and, dependent upon the extent of excitation of the magnetic circuit, yoke 37 is drawn with a certain force toward core 31. The pressure of the hydraulic medium entering through connection 3 will now increase until it has a value sufficient to lift valve body 46 and yoke 37 to such an extent that the pressure medium between the seat of bore 45 and valve body 46 can flow off through air gap 6 to hydraulic connection 15.

In the construction of FIG. 1, it has been found advantageous that the force acting in air gap 6 is available for control of the pressure setting valve upon excitation of the magnetic circuit. With a suitable design of membrane 47 supporting yoke 37, the deformation resistance of the membrane, upon lifting of yoke 37 due to admission of the hydraulic medium, is negligible. The hydraulic hysteresis upon loading and relief of the hydraulic pressure setting valve is thus proportional to the remanence of the paramagnetic material being used. As good magnetic materials have a substantially constant remanence over a very wide magnetization range, it is possible, at a certain excitation, to adjust a very well defined pressure value within very narrow tolerances.

Figure 2:
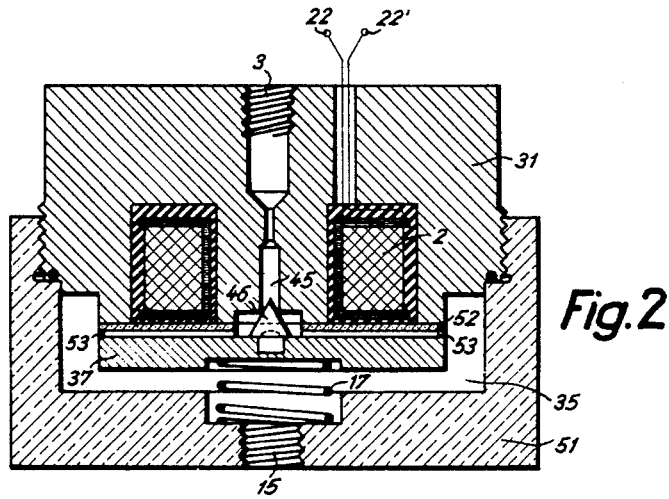

FIG. 2 illustrates an electromagnetically controlled fluid pressure setting valve wherein the pressure value is regulated against any desired pressure rather than against the normal atmospheric value. Thus, the entire valve housing between the two hydraulic connections must be pressure-proof.

Referring to FIG. 2, the valve shown therein again includes paramagnetic core 31 which receives magnetizing winding or coil 2, and hydraulic connection 3 extends centrally of winding 2. Flow channel 45 of hydraulic connection 3 again opens through the pole surface of the central pole of magnetic core 31, and winding 2 is again imbedded pressure-tight in the channel or recess in core 31. A cover 51 of diamagnetic or non-magnetizable material is connected in pressure-tight and oil-tight relation to magnetic core 31 in such a manner as to provide space 35 in the zone of the pole faces of bell magnet 31. The pole faces are covered by an annular plate 52 of diamagnetic or non-magnetizable material having a thickness equal to the minimum air gap desired and a central opening in the zone of flow channel 45. On its surface facing away from the pole faces, plate 52 is formed with radial grooves 53 extending from adjacent its center to its periphery.

Yoke 37 of paramagnetic or magnetizable material is elastically or resiliently biased against cover 51 by an extremely soft spring 17 so that it is in approximate equilibrium in the absence of electromagnetic excitation. The deformation resistance of the elastic mounting is negligibly small relative to the electromagnetic and hydraulic forces. Yoke 37 functions to receive valve body 46 of preferably diamagnetic or non-magnetizable material and controlling pressure fluid flow through channel 45. In the absence of fluid pressure magnetic forces, valve body 46 closes channel 45. Cover 51 is provided with fluid connection 15.

The operation of the valve shown in FIG. 2 will be clear from the following description. Due to the fact that space 35 between core 31 and cover 51, within which yoke 37 is arranged, is designed to be pressure-proof, pressure media at a specific initial pressure can be connected both to connection 3 and to connection 15. Under a preselected excitation of the electromagnetic circuit by magnetizing winding 2, the pressure in the zone of pressure medium connection 3 can be maintained higher, by a certain differential pressure value, than the pressure medium acting through connection 15. Due to the illustrated soft spring 17, there is the further advantage that the dead weight of yoke 37 is substantially compensated and no frictional errors enter into the electromagnetically controlled pressure setting. In addition, a secure sealing of flow channel 45 results from the automatic centering therein of valve body 46.

Figure 3:
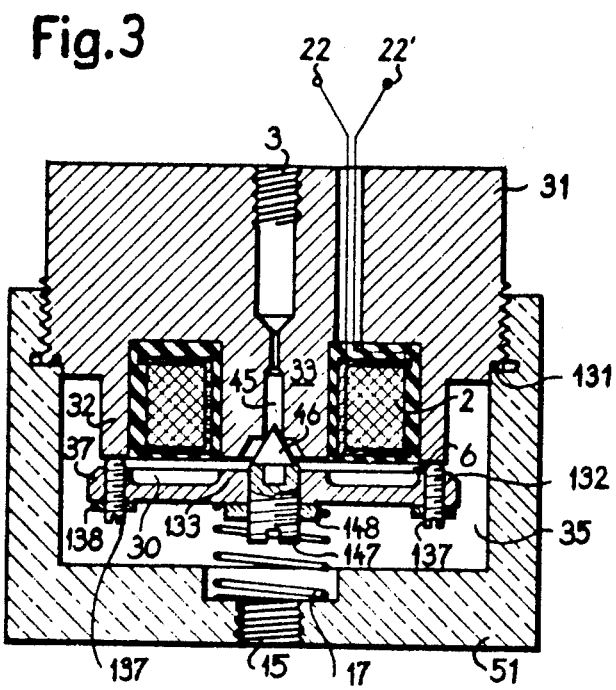

The valve shown in FIG. 3 is identical, in most respects, to that shown in FIG. 2. Thus, in FIG. 3, the valve includes magnetic core 31 in which there is molded or imbedded magnetizing winding 2 having connection points 22 and 22'. Furthermore, magnetic core leg 31 is arranged centrally with connection 3 opening into the bore 45. Outer leg 32 surrounds winding 2, and yoke 37 extends across the legs of the magnet core, leaving air gap 6. Cover 51 having connection 15 is threadedly secured to magnetic core 31 with the interposition of the packing 131 for sealing off the space 35. Yoke 37 is held substantially in equilibrium opposite core 31 by holding spring 17.

The valve shown in FIG. 3 differs from that shown in FIG. 2 in that a threaded bolt 147 provided with a lock nut 148 is adjustably threaded through the center of yoke 37, and mounts valve body 46. In alignment with magnet pole 32 embracing winding 2, individual threaded bolts 137, provided with lock nuts 138, are adjustably threaded through yoke 37 to engage pole 32. In its surface facing magnetic core 31, yoke 37 is formed with an annular groove or recess 30 which is in substantially mating relation with the annular recess in core 31 receiving winding 2. This forms two salient magnetic poles 132 and 133, one aligned with magnetic core leg 32 and the other aligned with magnetic core leg 33.

After the individual parts of the valve shown in FIG. 3 have been manufactured, they are assembled. During manufacture of the parts, certain tolerances must be taken into consideration. For example, deviations are permitted from a certain theoretical value and, during the processing, especially in the case of magnetically high-grade materials, certain property variations of the material may occur. Thus, after assembly, testing and calibration are necessary. This calibration is greatly simplified by the arrangement shown in FIG. 3.

When at least one point of the current-pressure characteristic has been established at a certain adjustment of the assembled valve, if deviation occur, the air gap can be varied, initially, to a value which subsequently furnishes a correct current-pressure characteristic. However, after the air gap has been adjusted, valve body 46 must be adjusted relative to the outlet edge of bore 45. This is possible, without re-machining, by loosening lock nut 148, adjusting threaded bolt 147 and re-tightening block nut 148. By adjusting the individual pins 137, each provided with a lock nut 138, it is possible to make the air gap exactly parallel or uniform throughout, and to adjust the valve body to a correct fit by further adjustment of threaded bolt 147. It is advantageous if at least those portions of the bolt 137 and 147 in the zone of air gap 6 are formed of diamagnetic or non-magnetizable material so as to not to have any influence on the magnetic circuit. Also, cover 51 is made of diamagnetic or non-magnetizable material.

The magnetic circuit including magnet 31, yoke 37 and air gap 6 is clearly defined in the zone of air gap 6 owing to the annular recess or groove 30 in yoke 37. Thus, the salient magnetic poles 132 and 133, comprising the air gap surfaces subjected to flow of the magnetic flux, and which determine the magnetic force, permit only extremely small and clearly controllable stray flux components. These clearly defined magnetic circuit conditions are facilitated by making the surface of leg 32 equal to the surface of salient pole 132, and the surface of leg 33 equal to the surface area of salient pole 132, and the surface of leg 33 equal to the surface area of salient pole 133.

Within the scope of the invention, other adjustable spacing elements may be used in place of threaded bolts. For example, smooth plane pins which are secured in position by plate spring elements may be used. Additionally, the yoke 37 could have its periphery threaded and a ring of non-magnetizable or diamagnetic material, having large recesses or notches, in the zone of air gap 6, allowing passage of the fluid, could be threaded onto yoke 37 to adjust the air gap. The portions of the ring between the fluid flow recesses can engage the annular leg 32 of magnet core 31 to assure establishment of the proper minimum air gap dimension.

As an additional alternative, those elements used for controlling the air gap and for adjustment of the valve body with respect to the bore 45 need not be arranged on the yoke but can be arranged in the core 31. Thus, it is possible to have the valve body arranged fixedly in the yoke and to have an insert element, formed with the connection 3 and the bore 45, adjustable from outside core 31. This is also true of the arrangement of adjustable elements such as the threaded pins in annular leg 32 of the magnet core. Arrangements of this type afford the advantage that the entire valve can be completely assembled and adjustment of the valve to the desired current-pressure characteristic be effected without disassembly.

FIGS. 4 to 7 illustrate various systems with which the electromagnetically controlled fluid pressure setting valve of the present invention may be used. In the system shown in FIG. 4, pressure medium 61 is collected in a tank or sump 62, and a pump 63 delivers the pressure medium through a line 64 into a pressure line 65. A maximum pressure valve 66 is connected to line 65 and also to return line 67 leading back into tank 62. The maximum pressure setting of valve 66 is effected by a hand wheel 68. A hydraulic pre-control line 73 extends from valve 66 to a hydraulic pressure setting valve 71 provided with an electromagnetic control 72, and corresponding to one of the valves shown in FIGS. 1, 2 and 3. Valve 71 is also connected with return line 67. Magnetizing winding 2 of setting means 72 is connected to a current rectifying and regulating device 79 supplied with A.C. current from source 80.

Figure 4:
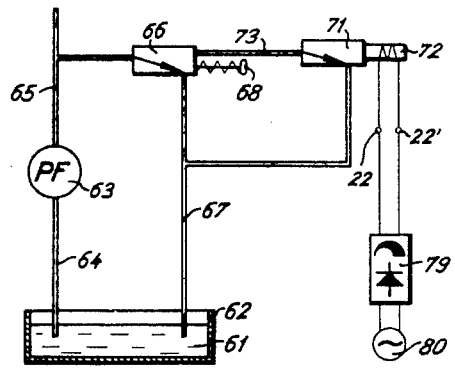
FIG. 4 is a schematic hydraulic circuit diagram showing a valve embodying the invention utilized as a pressure pre-control valve.

The circuit arrangement of FIG. 4 operates substantially as follows:

The maximum hydraulic pressure value is set on valve 66 by adjustment of hand wheel 68. All lower pressures differing from this maximum pressure are pre-set as electric control signals by the current rectifying and regulating device 79 operating through the electromagnetic pressure setting valve 71, 72, which is here used as a pre-control valve. With the arrangement of FIG. 4, pressure values may be set by remote control from a central station in such a manner that a specific value of electric potential or current corresponds to a specific hydraulic pressure value below the maximum pressure value.

In the circuit arrangement shown in FIG. 5, pressure line 65 has installed therein a throttle 85. Pressure setting valve 71 with electromagnetic setting means 72, which was connected to maximum pressure valve 66 through hydraulic pre-control line 73 in FIG. 4, is now connected with pressure line 86 downstream of throttle 85, and is not connected to return line 67. In the connection of valve 71 to line 86, there is provided an adjustable difference pressure valve 81 having a connection 87 to valve 71. A pressure setting spring 88 is provided in the zone of the connecting line 87, and line 87 is connected, through difference pressure valve 81, with return line 67. The excitation control potential or current for coil 2 of setting means 72 is applied at the two connection points 22 and 22′. It is thereby possible to effect, at the two connection points 22, 22′, a direct calibration in hydraulic values in the electric control means 21–27.

Depending on the quantity of hydraulic fluid flowing through throttle 85, there is a certain pressure gradient across the throttle. In effect, a certain set pressure gradient corresponds to a certain flow quantity. If, therefore, on the one hand the pressure between the pump and the throttle is tapped at the maximum pressure valve 66 and supplied to hydraulic pressure setting valve 71 and, on the other hand, the pressure downstream of throttle 85 is supplied as a counter pressure to pressure setting valve 71, and if the electromagnetic means 72 is now energized with a certain electrical value, then a certain difference pressure, which is thus provided in the pressure setting valve 71, is regulated.

Due to the presence of a pressure gradient in maximum pressure valve 66 by virtue of hydraulic pre-control through line 73, a certain adjustment of the hydraulic pressure setting valve 71 through its electro-magnetic setting will not correspond to a similar adjustment of the maximum pressure valve 66. To eliminate this disadvantage, difference pressure value 81 is connected between valve 71 and pressure line 86 downstream of the throttle 85 in such a manner that its initial loading, applied by the spring 88, corresponds to the pressure gradient of the hydraulic pre-control in maximum pressure valve 86, but in the opposite or compensating direction. This pressure gradient thus is compensated, in that there corresponds, to the pressure gradient from pressure line 65 to the pre-control line 73, the equally great pressure gradient between pressure line 86 and connecting line 87, and in a compensating manner. Thus, the pressure value set at valve 71 by the electromagnetic setting means act accurately through throttle 85. It is therefore possible to effect, in the electric control 20, 26 and at the two connection points 22, 22', a direct calibration in hydraulic values.

The arrangement of FIG. 5 provides a very simple volume regulation which can be effected by electric remote control from any desired location, and the electric remote control can be given any desired electric control program. Thus, a variety of flow quantities can be supplied to a consumer in a program-controlled manner, and it is also possible to use, alternatively, an indicating instrument such as a variable resistance 26 calibrated, for example, in hydraulic pressure values.

FIG. 6 illustrates the application of the pressure setting valve, such as shown in FIGS. 1, 2 and 3, in the circuit of a hydraulic pulsator. A specimen 92 to be tested is gripped at one end in a fixed clamping device 91 and has its other end connected with a clamping device 93 of a hydraulic pulsator. A cylinder 95 with a piston 96 displaceable therein is provided to generate the hydraulic pulsation forces. Using a hydraulic circuit such as shown in FIG. 4, there is interposed therein a four-way gate valve 100 connected to tank supply and return lines 65 and 67', respectively, and to two supply lines 101 and 102 leading to respective opposite ends of cylinder 95. However, in contrast to the circuit arrangement shown in FIG. 4, there is connected, to connection points 22, 22' of magnetizing winding 2, an adjustable frequency transformer and pulse generator 105 energized by source 80. The pulse generator provides, in accordance with a selected setting, an excitation of the magnetizing winding 2 of setting means 72 in accordance with a preselected sine, saw tooth, or rectangular pulse program. Furthermore, this control device may be provided with a variable D.C. output for static tests.

The arrangement of FIG. 6 permits utilization of the inherent elasticity of specimen 92 to test the same with an extremely simple hydraulic apparatus. In contrast to known constructions, it is merely necessary to pre-set the desired program electrically, which is very easy to do, and correspondingly to supply the magnetizing winding 2 of the electromagnetically controlled pressure setting valve 71. Thereby, this electrically pre-set program is made available in the hydraulic cycle within very narrow tolerances.

The electromagnetically controlled hydraulic pressure setting valve of the invention can be used for the pathwise positioning of hydraulic displacement devices. The path traveled is electrically copied and fed to two electromagnetic setting members of hydraulic pressure setting valves, embodying the invention, and these take over the control of the hydraulic positioning valve.

Figure 7:
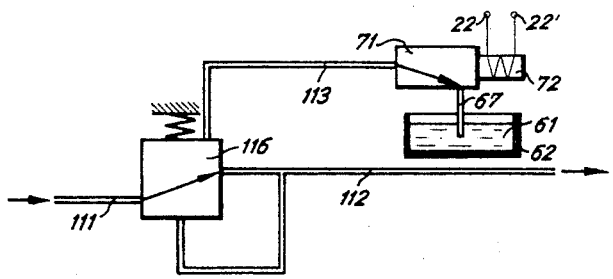
FIG. 7 is a view similar to FIGS. 4, 5 and 6 of a valve embodying the invention and use for pre-control of a pressure reducing valve.

In the arrangement of FIG. 7, a hydraulically pre-controllable pressure reducing valve 116 is so connected that, in the inlet line 111, the inlet pressure prevails and, in the outlet line 112, the constant reduced pressure value prevails. Establishment of the pressure value in line 112 is effected by the pre-control line 113 from the electromagnetically controlled fluid pressure setting valve 71 embodying the invention. In the arrangement of FIG. 7, it is possible to establish electrically, from any location, selectively or program-controlled, reduced constant pressures and to have these reproducibly available later in a hydraulic cycle within very narrow tolerance limits.

By reference to the relatively few examples of application of the electromagnetically controlled pressure setting valve of the present invention, it will be clear that the valve provides a considerable simplification as compared with the existing systems in a variety of applications. Furthermore, within the scope of the invention, other applications will be apparent. The essential feature of the valve is that, with any selected or defined electric value, a defined fluid value is correlated therewith, and that these fluid values, such as fluid pressure values, lie within very narrow tolerances. Also, there is no mechanical friction to be overcome and only the characteristics of the electromagnetic circuit determine tolerance limits.

While specific embodiments of the invention have been shown and described in detail to illustrate the application of the principles of the invention, it should be understood that the invention may be embodied otherwise without departing from such principles.

What is claimed is:

1. An electromagnetically controlled fluid pressure regulator, for electromagnetically regulating the pressure of a fluid in a continuous modulating manner, comprising, in combination, an axis-symmetrical bell magnetic core; a magnetizing winding imbedded in said core and having leads extending therefrom for connection to a source of regulable electric potential; a movable yoke which is axis-symmetrical to said magnetic core and has magnetically active surfaces, for movement of said yoke toward said core in accordance with the energization of said winding; means forming a pressure medium inlet connection; a flow channel arranged through a leg of said core, with an outlet end in communication with said inlet connection; a fluid regulating valve element disposed between said yoke and the inner end, acting as a valve seat, of said flow channel, and controlling discharge of pressure medium from said flow channel toward said yoke in accordance with the position of said yoke relative to said core, said valve element normally closing the inner end of said flow channel; whereby the electromagnetic forces on said yoke tending to draw said yoke toward said core oppose the fluid pressure forces on said yoke tending to force said yoke away from said core; and means supporting said yoke opposite said magnetic core in an equilibrium position with said element closing the inner end of sad flow channel, in the absence of energization of said winding, for friction-free movement of said yoke relative to said core, and in a position defining a substantially uniform air gap between all the legs of said magnetic core and the magnetically active surfaces of said yoke.

2. An electromagnetically controlled fluid pressure regulator comprising, in combination, an axis-symmetrical bell magnetic core; a magnetizing winding imbedded in said core; a yoke which is axis-symmetrical to said magnetic core and has magnetically active surfaces; means forming a pressure medium connection; a flow channel arranged through a leg of said core in communication with said connection; a fluid regulating element disposed between said yoke and said flow channel; and means supporting said yoke opposite said magnetic core, for friction-free movement relative to said magnetic core, and in a position defining a substantially uniform air gap between all the legs of said magnetic core and the magnetically active surfaces of said yoke; said yoke being centered with respect to said magnetic core by said regulating element cooperating with said flow channel.

3. An electromagnetically controlled fluid pressure regulator, as claimed in claim 1, including a housing of non-magnetizable material surrounding at least said yoke and the air gap between said yoke and said magnetic core, and providing a flow space; said housing being formed with a low pressure connection aperture.

4. An electromagnetically controlled fluid pressure regulator, as claimed in claim 3, in which said housing forms a pressure-tight connection with said magnetic core.

5. An electromagnetically controlled fluid pressure regulator, as claimed in claim 1, in which said supporting means substantially fully compensates the weight of said yoke.

6. An electromagnetically controlled fluid pressure regulator, as claimed in claim 5, in which said supporting means comprises a membrane.

7. An electromagnetically controlled fluid pressure regulator, as claimed in claim 3, in which said supporting means comprises a membrane substantially fully compensating the weight of said yoke.

8. An electromagnetically controlled fluid pressure regulator, as claimed in claim 5, in which said supporting means comprises a spring.

9. An electromagnetically controlled fluid pressure regulator, as claimed in claim 3, in which said supporting means comprises a spring disposed between said housing and said yoke and compensating the weight of said yoke to an extent such that, when said winding is deenergized, no resultant force acts between said valve element and said valve seat.

10. An electromagnetically controlled fluid pressure regulator comprising, in combination, an axis-symmetrical bell magnetic core; a magnetizing winding imbedded in said core; a yoke which is axis-symmetrical to said magnetic core and has magnetically active surfaces; means forming a pressure medium connection; a flow channel arranged through a leg of said core in communication with said connection; a fluid regulating element disposed between said yoke and said flow channel; and means supporting said yoke opposite said magnetic core, for friction-free movement relative to said magnetic core, and in a position defining a substantially uniform air gap between all the legs of said magnetic core and the magnetically active surfaces of said yoke; a housing of non-magnetizable material surrounding at least said yoke and the air gap between said yoke and said magnetic core, and providing a low pressure connection aperture; and a spring disposed between said housing and said yoke; the legs of said magnetic core being directed downwardly, and said spring constituting said supporting means and substantially fully compensating the weight of said yoke.

11. An electromagnetically controlled fluid pressure regulator, as claimed in claim 10, in which said spring is concentric with said yoke.

12. An electromagnetically controlled fluid pressure regulator comprising, in combination, an axis-symmetrical bell magnetic core; a magnetizing winding imbedded in said core; a yoke which is axis-symmetrical to said magnetic core and has magnetically active surfaces; means forming a pressure medium connection; a flow channel arranged through a leg of said core in communication with said connection; a fluid regulating element disposed between said yoke and said flow channel; means supporting said yoke opposite said magnetic core, for friction-free movement relative to said magnetic core, and in a position defining a substantially uniform air gap between all the legs of said magnetic core and the magnetically active surfaces of said yoke; and elements engaged with said yoke and with legs of said magnetic core and setting the minimum air gap.

13. An electromagnetically controlled fluid pressure regulator, as claimed in claim 12, in which said elements are adjustable to vary the width of said air gap.

14. An electromagnetically controlled fluid pressure regulator comprising, in combination, an axis-symmetrical bell magnetic core; a magnetizing winding imbedded in said core; a yoke which is axis-symmetrical to said magnetic core and has magnetically active surfaces; means forming a pressure medium connection; a flow channel arranged through a leg of said core in communication with said connection; a fluid regulating element disposed between said yoke and said flow channel; means supporting said yoke opposite said magnetic core, for friction-free movement relative to said magnetic core, and in a position defining a substantially uniform air gap between all the legs of said magnetic core and the magnetically active surfaces of said yoke; and elements in said magnetic core adjustable to set the positions of the components of said valve.

15. An electromagnetically controlled fluid pressure regulator comprising, in combination, an axis-symmetrical bell magnetic core; a magnetizing winding imbedded in said core; a yoke which is axis-symmetrical to said magnetic core and has magnetically active surfaces; means forming a pressure medium connection; a flow channel arranged through a leg of said core in communication with said connection; a fluid regulating element disposed between said yoke and said flow channel; means supporting said yoke opposite said magnetic core, for friction-free movement relative to said magnetic core, and in a position defining a substantially uniform air gap between all the legs of said magnetic core and the magnetically active surfaces of said yoke; and elements in said yoke adjustable to set the positions of the components of said valve.

16. An electromagnetically controlled fluid pressure regulator, as claimed in claim 15, in which an element is provided to adjust said fluid regulating element relative to said flow channel, said fluid regulating element comprising a valve body and the adjusting element therefor comprising a bolt, of non-magnetizable material, threaded adjustably through said yoke.

17. An electromagnetically controlled fluid pressure regulator comprising, in combination, an axis-symmetrical bell magnetic core; a magnetizing winding imbedded in said core; a yoke which is axis-symmetrical to said magnetic core and has magnetically active surfaces; means forming a pressure medium connection; a flow channel arranged through a leg of said core in communication with said connection; a fluid regulating element disposed between said yoke and said flow channel; means supporting said yoke opposite said magnetic core, for friction-free movement relative to said magnetic core, and in a position defining a substantially uniform air gap between all the legs of said magnetic core and the magnetically active surfaces of said yoke; and plural individual threaded bolts engaged with said yoke and with legs of said magnetic core, and adjustable to vary the width of said air gap.

18. An electromagnetically controlled fluid pressure regulator, as claimed in claim 17, in which said bolts, at least in the zone of the air gap, are formed of non-magnetizable material.

19. An electromagnetically controlled fluid pressure regulator, as claimed in claim 1, in which said yoke is formed with salient magnetic poles facing respective legs of said magnetic core.

20. An electromagnetically controlled fluid pressure regulator, as claimed in claim 1, in which the faces of the salient pole of the yoke correspond substantially to the end faces of the respective legs of said magnetic core.

21. A hydraulic control system comprising, in combination, an electromagnetically controlled fluid pressure regulator, including an axis-symmetrical bell magnetic core, a magnetizing winding embedded in said core, a yoke which is axis-symmetrical to said magnetic core and has magnetically active surfaces, means forming a pressure medium connection, a flow channel arranged through a leg of said magnetic core in communication with said connection, a fluid regulating element disposed between said yoke and said flow channel, and means supporting said yoke opposite said magnetic core, for friction-free movement relative to said magnetic core, and in a position defining a substantially uniform air gap between all the legs of said magnetic core and the magnetically active surfaces of said yoke; an electric control circuit controlling energization of said magnetizing winding; and a hydraulically pre-controllable valve in communication with said electromagnetically controlled pressure regulator, said electromagnetically controlled regulator controlling said pre-controllable valve.

22. A hydraulic control system, as claimed in claim 21, in which said electromagnetically controlled fluid pressure regulator constitutes a difference pressure valve.

23. A hydraulic system, as claimed in claim 22, including a maximum pressure valve and a throttle in communication with said difference pressure valve; said difference pressure valve, together with said maximum pressure valve, the throttle and the electrical control, comprising a volume regulator.

24. A hydraulic system, as claimed in claim 23, including a pressure line extending downstream from said throttle; and an adjustable difference pressure valve connected between said pressure line and said electromagnetically controlled difference pressure valve and compensating said maximum pressure valve.

25. A hydraulic system, as claimed in claim 21, in which said pre-controllable valve is a pressure reducing valve.

26. A hydraulic system, as claimed in claim 21, including an electric current meter in said electric control and connected in series with said magnetizing winding; said electric current meter being calibrated in fluid pressure values.

27. A hydraulic system, as claimed in claim 21, in which said electric control includes a variable resistance calibrated in fluid pressure values.

28. A hydraulic system, as claimed in claim 21, in which said electric control includes a current regulator.

29. A hydraulic system, as claimed in claim 21, in which said electric control includes a pulse generator; a hydraulic pulsator; and a valve for said pulsator; said electromagnetically controlled fluid pressure regulator controlling the valve of said hydraulic pulsator.

References Cited

UNITED STATES PATENTS

| | | | |
|---|---|---|---|
| 2,372,853 | 4/1945 | Ray | 251—141 |
| 2,860,850 | 11/1958 | Rhodes et al. | 251—139 |
| 3,001,549 | 9/1961 | Nelson et al. | 251—139 XR |
| 3,236,494 | 2/1966 | Frantz | 251—139 XR |

M. CARY NELSON, *Primary Examiner.*

ROBERT J. MILLER, *Assistant Examiner.*

U.S. Cl. X.R.

251—139